United States Patent Office 3,549,540
Patented Dec. 22, 1970

3,549,540
METHOD AND COMPOSITIONS FOR TREATING ALUMINUM SURFACES
David Y. Dollman, Doylestown, Pa., assignor to Amchem Products, Inc., Ambler, Pa., a corporation of Delaware
No Drawing. Continuation-in-part of application Ser. No. 590,487, Oct. 31, 1966. This application Dec. 22, 1967, Ser. No. 692,725
Int. Cl. C11d 7/54
U.S. Cl. 252—105
21 Claims

ABSTRACT OF THE DISCLOSURE

This invention relates to improvements in treating solutions for aluminum surfaces designed to remove the naturally occurring oxide film on such surfaces. Such solutions are commonly termed deoxidizing solutions.

The invention, in both its method and composition aspects, involves the addition of ferricyanides, ferrocyanides and/or nitroprussides to aluminum deoxidizing solutions to prevent the formation of copper smut on aluminum surfaces treated therein. The copper, which tends to form surface smut if the invention is not utilized, derives from the copper which is an important alloying constituent in many widely used aluminum alloys. The ferricyanides, ferrocyanides and nitroprussides of the invention are effective in a wide variety of deoxidizing solutions to prevent this copper deposition. Concentrates for addition to the deoxidizing solutions to replenish the ingredients which are consumed during the use of the solution can also be prepared in accordance with this invention. Such concentrates can contain the ferricyanides, ferrocyanides and/or nitroprussides of this invention, along with deoxidizing ingredients utilized in the solution.

---

This is a continuation-in-part of application Ser. No. 590,487, filed Oct. 31, 1966, now abandoned.

Aluminum and aluminum alloys have on them a naturally occurring adherent, but normally uneven, coating of aluminum oxide which results from contact of the surface with the atmosphere. On many occasions in the industrial field it is necessary to remove this oxide layer from the surface. For example, it is often necessary to remove the oxide in order to lower the surface resistivity of the aluminum so that it can be successfully spot welded by electrical techniques. As another example, it is often necessary to remove the oxide coating in preparation for the later application of a deliberately formed protective coating on the surface, such as an anodized coating, or a chemical conversion coating, such as an amorphous chromate coating.

Workers in the art have developed a variety of solutions for dissolving the oxide coating on the aluminum surface, and these solutions are commonly called deoxidizing solutions. They are also occasionally called cleaning solutions, since in addition to removing the oxide film on the surface, they are sometimes chemically active enough to remove objectionable dirt and soil. Examples of deoxidizing solutions for aluminum are disclosed in the following patents: U.S. 2,655,439; 2,828,193; 2,833,311; 3,003,896; 3,138,485; 3,140,203; Great Britain 930,755 and Great Britain 930,756. It will be noted that while the disclosed deoxidizing solutions have a variety of compositions, they are all strongly acidic, and a number of them employ chromic acid and a fluoride material, together with nitric acid or some other suitable mineral acid, such as sulfuric acid, in an amount sufficient to impart to the solution an acidity high enough for the solution to exert deoxidizing effects.

As was mentioned above, many important aluminum alloys contain copper. All of the deoxidizing solutions attack and dissolve the oxide film (which is the desired function of the solution), but they also attack, to some extent, the underlying base metal surface. Thus, it is substantially inevitable that some aluminum and, more importantly, some copper, will be dissolved in the deoxidizing solution. But it has been found that conditions at the aluminum surface in deoxidizing are favorable for the reprecipitation or redeposition of the copper dissolved by the solution back on to the surface. This deposit often takes the form of a thin layer of copper-bearing powder which the art calls "smut," and may in some cases take the form of a thin layer of metallic copper which colors the surface a dingy red.

It should be noted that a so-called "black smut" is also sometimes formed on the aluminum surface as a result of pretreatment steps, such as for example a heavy alkali etch treatment prior to deoxidizing. Black smut is the result of copper deposition in its oxide form, together with salts of other metals. Deoxidizing solutions of the prior art are intended to remove this black smut in the course of removing the oxide film. However, when the smut is removed and decomposed by the deoxidizing solution, the components, such as copper, comprising the smut are released into the deoxidizing solution. When the copper content in the solution reaches a high enough level, metallic copper tends to deposit on the aluminum surface. Thus, removal of the black smut by the deoxidizing solution can lead to an undesirable "copper smut."

Whatever the form, the smut is difficult to remove. (In this disclosure, the term "smut" will be employed in a broad sense to include all types of undesirable copper-bearing surface coating, whatever their specific form.)

While smut formation is a problem inhering in substantially all of the prior art deoxidizing solutions, it is especially serious in those solutions which make use of fluoride compounds.

A very problematic aspect of the deposition of smut on aluminum surfaces that are being deoxidized is that a deoxidizing solution containing dissolved copper ions can be utilized for some time without the formation of a copper deposit on the aluminum surface. Then, for no apparent reason, smut begins to deposit on the aluminum surface. There is no method yet known to the art to ascertain the level at which the accumulated copper will begin to deposit on the aluminum being treated.

Copper smut is generally undesirable on aluminum, and the smut resulting from deoxidizing treatments done in preparation for further treatment of the aluminum, such as chromate coating, is particularly undesirable because it tends to interfere with the uniform application of a good protective coating. Furthermore, the smut, in contact with the metallic aluminum surface, will establish a multitude of bimetallic couples which tend to initiate and accelerate corrosion of the underlying aluminum.

It is an object of this invention to provide improved methods and compositions for treating aluminum surfaces to deoxidize them.

It is a more particular object of the invention to provide such methods and compositions for deoxidizing aluminum surfaces to produce surfaces which are smut-free.

A related object of the invention is to prevent the formation of copper smut on aluminum surfaces during the course of deoxidizing.

Still another object of the invention is to provide a method of conditioning and maintaining aluminum deoxidizing solutions so that they will not produce copper smut on the aluminum surface during the course of use.

It is still another object of this invention to provide a concentrate for replenishing the ingredients which are consumed during the use of a deoxidizing solution.

I have discovered that if an addition agent from the class consisting of ferricyanides, ferrocyanides and nitroprussides, is added to acidic deoxidizing solution, deposition of copper as smut or otherwise on the aluminum surface is effectively prevented. I have also discovered that certain formulations of deoxidizing solutions, including as a component thereof ferricyanides, and/or nitroprussides as described above, are especially effective deoxidizing materials for aluminum surfaces.

It should be noted that when a ferrocyanide is placed in an aqueous acidic environment such as exists in deoxidizing solutions, it is converted to ferricyanide. Thus, for the purposes of this invention, ferrocyanide can be regarded as equivalent to ferricyanide, and can safely be added, if desired, in place of ferricyanide as an effective deoxidizing solution addition agent. For these special reasons, there is used herein and in the claims the terms "ferricyanide" when referring to the presence in the deoxidizing solution of materials added thereto in the ferrocyanide form, as well as the ferricyanide form.

As mentioned above, a number of deoxidizing solutions contain chromic acid and a fluoride material. A surprising and unexpected discovery arising out of the development of this invention is that there can be prepared stable replenishing concentrates containing chomic acid, fluoride, and the nitroprusside of this invention, for replenishing the ingredients of the deoxidizing solution as they are depleted during the deoxidizing process. The stability of such replenishing concentrates is surprising because it would have been expected that the chromic acid ingredient of the concentrate would have caused the nitroprusside to decompose and give off hydrogen cyanide.

Ferricyanide and ferrocyanide can be added to the deoxidizing solution in the form of any soluble salt. The ferricyanide or ferrocyanide salts of the alkali metals, including ammonium, are preferred, particularly the sodium salt.

The nitroprusside can be introduced into the deoxidizing solution in the form of any soluble salt. The sodium salt is preferred because of its commercial availability. Examples of other nitroprusside salts that can be used, include those formed with potassium, ammonium, lithium, calcium, barium, selenium, magnesium, zinc, cobalt and lead.

The ferricyanide or nitroprusside may be included in the deoxidizing solution in amounts selected to be adequate to sequester the copper entering or likely to enter the solution during the course of use of the solution.

The term "sequester" is used herein to mean tie-up of sufficient copper ions by the addition agents to prevent or reduce the tendency of copper from depositing in the form of smut on the surface of the aluminum being deoxidized and in a manner such that the actual deoxidizing is not interferred with. Amounts of copper entering the solution will depend on various things, including the amount of copper present in the aluminum alloy, the conditions of an alkaline pre-etch, and the conditions of deoxidizing. Usually, only one such addition agent need be employed, but, if desired, mixtures may be used.

Short of the upper limit of the solubility of the particular ferricyanide, ferrocyanide or nitroprusside employed, there is no physically imposed upper limit of concentration, although practical economic considerations will lead one to use no more than is reasonably necessary to sequester all of the copper which is expected to enter the solution during use. Similarly, even very low concentrations of the defined ferricyanides or nitroprussides give a beneficial effect. However, it is preferred that at least 0.34 gram of ferricyanide ion, or an equivalent of nitroprusside ion (both calculated as ferricyanide), be present in the deoxidizing solution for each 0.1 gram of copper present in said solution.

If it is found that, in a particular solution being used, the ferricyanide or nitroprusside is being consumed to sequester copper at a rate different than the rate at which the other constituents of the deoxidizing solution are consumed, the ferrocyanide, ferricyanide or nitroprusside may be added separately to the solution as a replenishing material, in amounts preferably sufficient to maintain the above stated ratio of ferricyanide or nitroprusside to dissolved copper. On the other hand, if the rate of consumption of ferricyanide or nitroprusside is about the same as the rate of consumption of other materials, it (or ferrocyanide) may be added as part of a blended or compounded replenishing material, such replenishing materials discussed more fully hereinafter.

In practice, it has been found that the mechanism of sequestering includes the formation of copper-containing insoluble material which is sufficiently dense to precipitate out of the deoxidizing solution. The precipitate can be removed from the solution bath at convenient intervals. It has also been observed in the practice of this invention that such copper-containing precipitate which happens to accumulate on the aluminum surface tends to be washed off the surface as the article is withdrawn from the bath. This is unlike the smut deposit which tends to cling to the aluminum surface and is thus quite difficult to remove.

I have also found that deoxidizing solutions, even used deoxidizing solutions, which do not or did not initially contain ferricyanide or nitroprusside can be greatly improved if these materials or ferrocyanide is added to them. Thus, greatly improved product quality can be obtained if ferricyanide, ferrocyanide or nitroprusside are added as addition agents, using the guidelines set out above, to working deoxidizing solutions.

While the addition of ferricyanide, ferrocyanide, or nitroprusside to a wide variety of acidic deoxidizing solutions, especially those containing fluoride, improves those solutions by eliminating copper smut, I have found that when these ingredients are incorporated in combination with chromic acid, bifluoride, and nitric acid or other suitable acid, such as sulfuric, there results a deoxidizing solution which is especially useful and which produces very satisfactory deoxidized aluminum surfaces. In such a solution, the proportions of chromic acid, bifluoride, and nitric acid are not critical and can be adjusted in accordance with the experience of the art so that they are present in oxide removing proportions, and the quantity of ferricyanide and/or nitroprusside should be established at a level so that there is at least 0.34 gram of ferricyanide for each 0.1 gram of copper that will be dissolved into the solution during the use before replenishing.

The use of my invention may be further understood from a consideration of the following examples.

EXAMPLE I

A deoxidizing solution which contained the following material:

| | Grams/liter |
|---|---|
| Chromic acid | 10 |
| Sodium bifluoride | 2 |
| Nitric acid (100% basis) | 50 |
| Water, balance. | | was used for some time to deoxidize aluminum surfaces. After a period of use the bath was analyzed and found to contain 0.5 gram of copper. The copper, of course, was accumulated in the bath as the solution dissolved copper out of the aluminum alloys treated therein.

At this point, a test panel of Alclad Alloy No. 2024 aluminum was deoxidized in this bath. When the panel was withdrawn from the bath, copper smut in the form of a red deposit was present on the panel. The panel, with its red deposit, was then given a protective chemical conversion coating of the chromate type, and tested in salt spray for 936 hours.

Immediately following the processing of the above test panel, 1.5 grams of ferricyanide ion, in the form of potassium ferricyanide, were added to the solution. A second Alclad Alloy No. 2024 aluminum panel was then deoxidized in the ferricyanide-containing solution. When the panel was removed from the solution, it was observed that no red deposit was present on the panel. This panel was then given the same protective chemical conversion coating as the first panel. This panel, too, was salt spray tested for 936 hours.

At the end of the salt spray tests of both of the abovementioned panels they were compared. The first panel, which had been treated in the deoxidizing solution containing accumulated copper, but before the addition of ferricyanide, showed severe surface corrosion. It showed this corrosion despite the fact that it had been given a chromate conversion coating designed to impart corrosion resistance. However, since the coating was applied over the copper smut its effectiveness was in large measure dissipated.

The second panel, which had been treated in the same deoxidizing solution having an accumulation of copper therein, but after the addition of ferricyanide, showed no corrosion at the end of the salt spray test. Because of the effective use of the invention, the chromate conversion coating applied to the second panel was able to fully protect the panel against corrosion.

EXAMPLE II

This example illustrates the effectiveness of the deoxidizing solutions of this invention on aluminum surfaces having present thereon a copper-containing black smut as the result of a previous alkali etch treatment. The deoxidizing solutions set forth in Example I, as well as all of the other aspects of the test procedure outlined therein, were utilized.

After the solutions were worked for some time to deoxidize surfaces of copper-bearing aluminum alloy, two aluminum test panels, each covered with copper-containing black smut as the result of an alkali etch treatment, were subjected to deoxidizing solutions, one solution containing ferricyanide ion and the other without said ion. When the test panels were withdrawn from the deoxidizing solutions, it was observed that the panel that was deoxidized in the solution containing the ferricyanide had no copper deposit on its surface, whereas a copper deposit was present on the surface of the panel that was deoxidized in the solution that contained no ferricyanide. A chromate conversion coating was then applied to each of the test panels after which they were subjected to salt spray tests. The panel treated in the deoxidizing solution containing no ferricyanide showed severe surface corrosion. On the other hand, the panel treated in the deoxidizing solution containing ferricyanide showed no corrosion at the end of the salt spray test.

From the foregoing, it can be seen that the present invention provides a simple means for producing smut-free deoxidized aluminum surfaces, and that the advantages of such surfaces can be fully exploited, if desired, during later processing of the aluminum, for example, by a chromate coating operation.

In accordance with this invention and as mentioned above, it has been found that stable replenishing concentrates containing chromic acid or salts of chromic acid and the nitroprusside addition agent can be prepared. That such stable replenishing concentrates can be prepared is indeed surprising, as will become apparent from the following discussion.

It is known that under certain conditions ferricyanide is decomposed by chromic acid to release hydrogen cyanide gas. The rate of release of the hydrogen cyanide is dependent on the relative proportions of the reactants and the pH. For example, in an aqueous solution having a pH of 1 to 2 and containing 1 g./l. of potassium ferricyanide and 5 g./l. of chromic acid, the rate of decomposition of the ferricyanide and the rate of release of the hydrogen cyanide is very slow and hardly noticeable. However, if the concentration of chromic acid in such a solution is increased to 50 g./l. or higher, the rate of decomposition of the ferricyanide and rate of release of hydrogen cyanide is quite fast. The same holds true if only trace amounts of ferricyanide are present.

It is also known that ferricyanide is decomposed by chromic acid in powdery formulations if moisture, even small amounts thereof, is present in the powdery formulation. If the powdery formulation is kept dry, no such decomposition occurs.

In view of the decomposition effects that chromic acid is known to have on ferricyanide, it was expected that chromic acid would have the same effect on nitroprusside because of the chemical similarity of the two. It is noted that the ferricyanide radical is $[Fe(CN)_6]$ and the nitroprusside radical is $[Fe(NO)(CN)_5]$.

However, it has been found, contrary to the expected, that nitroprussides are not decomposed by chromic acid, even high concentrations thereof. Thus stable replenishing concentrates containing nitroprusside and relatively large amounts of chromic acid or salts thereof can be prepared in either liquid or powdery form for the purpose of replenishing the ingredients that are depleted as the deoxidizing solutions are used. Such concentrates are stable over long periods of time. With respect to a powdery concentrate, moisture does not affect stability, i.e., the presence of moisture does not trigger the decomposition of the nitroprusside as it does when present in powdery formulations containing ferricyanide and a salt of chromic acid.

An example of such a stable replenishing concentrate is one containing nitroprusside along with chromic acid, hydrofluoric acid or salts of these acids.

In addition, the concentrate can also contain a mineral acid or salt thereof. Such acidic materials are commonly used ingredients in deoxidizing solutions for aluminum. Examples are nitric acid, sulfuric acid and water soluble salts of these acids.

The availability of such replenishing concentrates is important because of the extensive use made of deoxidizing solutions containing chromic acid, fluoride and a mineral acid.

With respect to the ferricyanide and ferrocyanide addition agents of this invention, powdery replenishing concentrates containing these addition agents and salts of chromic acid can be prepared and maintained stable if precaution is taken to prevent the powdery concentrate from taking up moisture in amounts such that decomposition of the addition agent by chromic acid is triggered. Even though such precaution must be taken, the use of such powdery concentrates has an economic advantage over the use of a powdery concentrate containing nitroprusside, because at current market prices ferri- and ferro-cyanides are cheaper in cost than nitroprussides.

The use of either a liquid or powdery concentrate has benefits peculiar to each form of the concentrate. In general, it is less costly to ship and transport the powdery concentrate than the liquid concentrate. On the other hand, the use of a liquid concentrate has the advantage that it does not have to be dissolved prior to the time it is added to the deoxidizing solution.

The amount of addition agent used in the concentrate will depend on the rate at which the addition agent is being depleted in a particular deoxidizing application. Economic considerations dictate that the use of excessive amounts in the concentrate be avoided.

In practice it has been found that it will not generally be necessary to have more than about 9 g./l. of ferricyanide (calculated as $[Fe(CN)_6]$) present in a liquid concentrate formulation. Of course, appropriate amounts of water soluble salts of ferri- or ferro-cyanide can be incorporated into a liquid or powdery formulation to provide a ferricyanide concentration ranging up to about 9 g./l.

It has also been found that it will not generally be necessary to have more than about 10 g./l. of nitroprusside (calculated as [Fe(NO)(CN)$_5$]) present in a liquid formulation, or with respect to a powdery concentrate an appropriate amount of water soluble nitroprusside salt to provide a nitroprusside concentration ranging up to about 10 g./l. when the powdery concentrate is dissolved.

However, in certain applications, the amount of dissolved copper in the deoxidizing solution will exceed that which is normally experienced. For such applications, it will be advantageous to use a greater amount than set forth above of the addition agent in the replenishing concentrate. For such applications, as much addition agent as is necessary to do the job can be added to the concentrate, the maximum amount being limited only by the solubility limit of the particular addition agent utilized.

An example of an application wherein greater amounts of dissolved copper tend to accumulate in the deoxidizing solution than is normally experienced is in the deoxidizing treatment of aluminum alloys which were previously subjected to a pre-treatment alkali etch of some minutes. After being subjected to such pre-treatment operation, there is left on the aluminum alloy surface a black smut made up of copper oxide and the oxides of other alloying metals present in the aluminum. When such smut covered surface is subjected to the deoxidizing solution, the quantity of copper entering the solution can be on the order of 1 to 5 mg./sq. ft. of aluminum being processed. For this type application, greater amounts of the ferricyanide, ferrocyanide and nitroprusside will be needed in the replenishing concentrate in order to obtain the most effective results.

With respect to the amounts of deoxidizing ingredients utilized in the concentrate, they can be adjusted in accordance with the known technology. Thus, in a concentrate for deoxidizing solutions containing chromic acid and fluoride, together with a suitable mineral acid, the ingredients should be present in such quantities that they will exert a deoxidizing action on the aluminum surface rather than a coating action. It is noted that such concentrates are, or provide, an extremely acidic aqueous solution, so much so that ordinary techniques for measuring the pH of the solution can not be utilized. In general, the pH is less than about 0.1.

In an evaluation to determine the stability of a replenishing liquid concentrate containing nitroprusside according to this invention, a solution of:

| Ingredient: | Percent by weight |
| --- | --- |
| Chromic acid | 17.27 |
| Hydrofluoric acid (70%) | 8.66 |
| Sodium nitroprusside, Na$_2$[Fe(CN)$_5$NO]·2H$_2$O | 1.12 |
| Water | 72.95 | was made up and left to age for six weeks. Its color was then examined and found to be exactly the same as when the solution was made. Had the formulation been unstable, the color of the formulation would have changed due to liberation of hydrogen cyanide.

A second solution like the one described immediately above was made up and exposed to a temperature of 65° C. for 24 hours in a polyethylene bottle. This test is used in industrial practice to simulate a shelf life of one year at room temperature. No discoloration of the sample was observed.

In evaluations using other nitroprusside salts, satisfactory results were obtained.

In another evaluation to determine the effectiveness of a liquid concentrate containing nitroprusside according to this invention, a standard deoxidizing bath was made up by the use of a make-up concentrate formed of 200 g./l. of chromic acid, 17.5 g./l. of hydrofluoric acid, sufficient nitric acid (10%) to impart the proper acidity to the bath for it to exert a deoxidizing action and water to make 1 liter. The solution was used to process bare aluminum alloy 2024 (containing 3.9 to 5.0 weight percent copper) until 22 grams of aluminum were dissolved in the bath. (Replenishment was carried out as required, with a standard replenishing solution.) Then test panels of clad aluminum 2024 (containing no copper) were processed through the bath and the presence of a deposit of red speckles on them was observed. When the bath next needed replenishment, instead of using the standard replenishing solution, use was made of a liquid replenishment solution or concentrate according to this invention. This concentrate consisted of:

| Ingredient: | Percent by weight |
| --- | --- |
| Chromic acid | 17.27 |
| Hydrofluoric acid (70%) | 8.66 |
| Sodium nitroprusside | 1.12 |
| Water | 72.95 |

Replenishment with nitric acid was also performed in the customary manner. Additional aluminum clad alloy 2024 test panels were processed through the bath and this time no copper deposit or smut of any kind was observed. This is illustrative of the effectiveness of the use of a liquid concentrate and a deoxidizing solution within the scope of this invention to prevent the deposition of copper or smut on an aluminum surface processed through a worked deoxidizing bath.

Another evaluation, similar in all aspects as to the one recited immediately above, shows that when test panels having on their surfaces a copper-containing black smut, as the result of a previous alkali etch treatment, are subjected to deoxidizing solutions, the one treated in the solution without nitroprusside has a copper deposit on its surface when withdrawn therefrom, whereas the panel treated in the solution with nitroprusside has no copper deposit on its surface.

The following examples are illustrative of additional concentrates of this invention.

EXAMPLE A

This is an example of a powdery concentrate containing nitroprusside.

| Ingredient: | Percent by weight |
| --- | --- |
| Potassium dichromate | 73.8 |
| Sodium bifluoride | 22.7 |
| Potassium nitroprusside | 3.5 |

EXAMPLE B

This is an example of a powdery concentrate containing ferrocyanide.

| Ingredient: | Percent by weight |
| --- | --- |
| Potassium dichromate | 73.8 |
| Sodium bifluoride | 23.2 |
| Potassium ferrocyanide | 3.0 |

EXAMPLE C

This is an example of a powdery concentrate containing ferricyanide.

| Ingredient: | Percent by weight |
| --- | --- |
| Potassium dichromate | 73.8 |
| Sodium bifluoride | 23.7 |
| Potassium ferricyanide | 2.5 |

EXAMPLE D

This is another example of a powdery concentrate containing ferricyanide.

| Ingredient: | Percent by weight |
| --- | --- |
| Potassium dichromate | 20.0 |
| Sodium bifluoride | 1.0 |
| Potassium ferricyanide | 1.0 |
| Sodium hydrogen sulfate | 78.0 |

In practice, the concentrates of Examples A to C will be used with a sufficient quantity of a suitable mineral acid, for example nitric or sulfuric, so that the resultant aqueous solution will be sufficiently acidic to exert a deoxidizing action on the aluminum to be treated. On the other hand, the concentrate of Example D contains an adequate amount of a salt of a mineral acid so that it requires mere dilution with an appropriate amount of water.

It will be appreciated that the foregoing examples are given for purposes of illustration only and that the essential ingredients set forth above may be incorporated in formulations or concentrates in the form of water soluble salts other than those illustrated. By way of example, the fluoride may be introduced as a complex fluoride, such as sodium silicofluoride, the ferricyanide as sodium or ammonium ferricyanide and the ferrocyanides as sodium or ammonium ferrocyanide.

I claim:

1. A method for preventing the formation of smut on the surface of copper-bearing aluminum alloys as a consequence of treatment of said surface with an aqueous acidic deoxidizing solution which deoxidizes aluminum comprising establishing and maintaining in said acidic deoxidizing solution an addition agent soluble therein and selected from the class consisting of ferricyanide and nitroprusside and mixtures thereof, and treating aluminum surfaces with said deoxidizing solution to remove therefrom oxide coating on said surface, wherein the amount of said addition agent in said deoxidizing solution is at least sufficient to reduce the tendency of smut to form on said surface as it is treated with said solution.

2. A method in accordance with claim 1 wherein said ferricyanide is derived from the addition to said solution of a water soluble salt of ferrocyanide.

3. A method in accordance with claim 1, wherein the amount of said addition agent established and maintained in said acidic deoxidizing solution is at least 0.34 gram (calculated as ferricyanide ion) for each 0.1 gram of copper present in said solution.

4. A method for producing a deoxidized aluminum surface comprising deoxidizing said surface by treating it with an aqueous acidic deoxidizing solution which deoxidizes aluminum and which contains an addition agent selected from the class consisting of a water soluble salt of ferricyanide, ferrocyanide and a nitroprusside and mixtures thereof, wherein the amount of addition agent present in said solution is at least sufficient to reduce the tendency of smut to form on said surface as it is treated with said solution.

5. A method in accordance with claim 4, in which one essential oxide removing ingredient of said deoxidizing solution is fluoride.

6. A method in accordance with claim 4, wherein the amount of said addition agent dissolved in said deoxidizing solution is at least 0.34 gram (calculated as ferricyanide ion) for each gram of copper dissolved therein and to be dissolved therein during the course of use of said solution before replenishment thereof.

7. A method for producing a deoxidized surface on a copper-bearing aluminum alloy comprising treating said surface with an aqueous acidic aluminum deoxidizing solution to deoxidize it, said solution consisting essentially of chromate, fluoride and nitric acid and, as a copper sequestering agent, a material selected from the class consisting of ferricyanide and nitroprusside, and mixtures thereof, wherein said material is soluble in said solution.

8. A composition for use in preparing an aqueous acid aluminum deoxidizing solution of the type in which the principal and essential oxide removing ingredients are chromate, fluoride, and nitric acid, said composition consisting essentially of said oxide removing ingredients in proportions capable of removing oxide from aluminum, and also an addition agent selected from the class consisting of a water soluble salt of ferricyanide, ferrocyanide and nitroprusside and mixtures thereof in a copper sequestering amount.

9. A formulation for use in preparing an aqueous acidic deoxidizing solution that deoxidizes aluminum or for replenishing the ingredients of such solution as they are depleted during the use of the solution, the formulation consisting essentially of a nitroprusside, which is soluble in said solution, in a copper sequestering amount and a chromium compound selected from the group consisting of chromic acid and a salt of chromic acid.

10. A formulation according to claim 9 wherein the formulation is an aqueous solution.

11. A formulation according to claim 9 which is in powdery form.

12. A formulation according to claim 9 which also includes a source of fluoride and a mineral acid.

13. A formulation according to claim 9 wherein the amount of nitroprusside present in the formulation is such that an aqueous solution of the formulation has a nitroprusside concentration ranging up to about 10 g./l.

14. A powdery formulation for use in replenishing or making up an aqueous acidic aluminum deoxidizing solution consisting essentially of a source of chromic acid, fluoride, a mineral acid and an addition agent selected from the class consisting of a water soluble salt of a ferricyanide, a ferrocyanide and a nitroprusside and mixtures thereof, the amounts and proportions of the ingredients present in the formulation being such that an aqueous solution prepared from them is very acidic and has a pH of less than about 0.1 and is capable of deoxidizing aluminum, and wherein the amount of addition agent present in the formulation is such that it is at least sufficient to reduce the tendency of copper present in said solution to form smut on an aluminum surface deoxidized in said solution.

15. An aqueous acidic deoxidizing solution for deoxidizing aluminum consisting essentially of a chromium compound selected from the group consisting of chromic acid and a salt of chromic acid, fluoride and a mineral acid in amounts effective to deoxidize the aluminum, and an addition agent selected from the class consisting of ferricyanide and nitroprusside and mixtures thereof, the addition agent being present in an amount sufficient to reduce the tendency of smut to deposit on the aluminum and wherein the addition agent is soluble in said solution.

16. An acidic deoxidizing solution according to claim 15 wherein the mineral acid is selected from the group consisting of nitric acid and sulfuric acid.

17. A powdery formulation for use in preparing an aqueous acidic deoxidizing solution of for replenishing the ingredients of such solution as they are depleted during the use of such solution, the formulation consisting essentially of materials which are effective to deoxidize aluminum, including a chromium compound selected from the group consisting of chromic acid and a salt of chromic acid and fluoride, and an addition agent selected from the class consisting of a water soluble salt of ferricyanide and ferrocyanide, and mixtures thereof, the amounts and proportions of the ingredients present in the formulation being such that an aqueous solution prepared from them is very acidic and has a pH of less than about 0.1 and is capable of deoxidizing aluminum, and wherein the amount of addition agent present in the formulation is such that it is at least sufficient to reduce the tendency of copper present in the solution to form smut on an aluminum surface deoxidized in said solution.

18. A formulation in accordance with claim 17 wherein the amount of the addition agent present in the formulation is such that an aqueous solution of the formulation has a ferricyanide concentration ranging up to about 9 g./l.

19. A method for inhibiting the tendency of smut to form on an aluminum surface as it is deoxidized in a deoxidizing solution comprising deoxidizing said surface by immersing it in an aqueous acidic deoxidizing solution which deoxidizes aluminum, said solution containing an addition agent selected from the class consisting of ferricyanide and nitroprusside and mixtures thereof, said solution also containing copper which tends to form smut on said surface, wherein said addition agent is soluble in said solution and is present in an amount at least sufficient to reduce the tendency of smut to form on said surface while it is immersed in said solution and withdrawing said surface from said solution.

20. A method according to claim 19 wherein the amount of said addition agent present in said solution is at least 0.34 gram (calculated as ferricyanide ion) for each 0.1 gram of copper present in said solution.

21. A method for inhibiting the tendency of smut to form on an aluminum surface as it is deoxidized in a deoxidizing solution comprising deoxidizing said surface by immersing it in an aqueous acidic deoxidizing solution consisting essentially of chromate, fluoride, a mineral acid selected from the group consisting of sulfuric acid and nitric acid and an addition agent selected from the class consisting of ferricyanide and nitroprusside and mixtures thereof, said solution also containing copper, wherein said addition agent is soluble in said solution and the amount thereof is at least 0.34 gram for each 0.1 gram of copper present in said solution and withdrawing said surface from said solution.

References Cited

UNITED STATES PATENTS

| | | | |
|---|---|---|---|
| 2,018,388 | 10/1938 | Tosterud | 156—22UX |
| 2,828,193 | 3/1958 | Newman | 252—79.3X |
| 3,003,896 | 10/1961 | Kendall | 134—3 |
| 3,138,485 | 6/1964 | Kaveggia et al. | 252—79.3X |
| 3,331,710 | 7/1967 | Lodeesen et al. | 156—22 |
| 3,367,799 | 2/1968 | Beyerle | 134—3 |

MAYER WEINBLATT, Primary Examiner

U.S. Cl. X.R.

134—3; 156—19, 22; 252—79.3

UNITED STATES PATENT OFFICE
CERTIFICATE OF CORRECTION

Patent No. 3,549,540          Dated December 22, 1970

Inventor(s) David Y. Dollman

It is certified that error appears in the above-identified patent and that said Letters Patent are hereby corrected as shown below:

IN THE SPECIFICATION

Column 2, line 66, "of" should read --for--.

Column 3, line 3, "solution" should read --solutions--.

Column 3, line 17, "terms" should read --term--.

IN THE CLAIMS

Claim 17, line 44, "of" should read --or--.

Signed and sealed this 27th day of April 1971.

(SEAL)
Attest:

EDWARD M. FLETCHER, JR.          WILLIAM E. SCHUYLER,
Attesting Officer          Commissioner of Pater

UNITED STATES PATENT OFFICE
CERTIFICATE OF CORRECTION

Patent No. 3,549,540      Dated December 22, 1970

Inventor(s) David Y. Dollman

It is certified that error appears in the above-identified patent and that said Letters Patent are hereby corrected as shown below:

IN THE CLAIMS

Claim 21, Column 12, line 1, insert after "0.34 gram"

--(calculated as ferricyanide ion)--.

Signed and sealed this 7th day of September 1971.

(SEAL)
Attest:

EDWARD M. FLETCHER, JR.
Attesting Officer

ROBERT GOTTSCHALK
Acting Commissioner of Patents

REEXAMINATION CERTIFICATE (190th)
United States Patent [19]
Dollman

[11] B1 3,549,540
[45] Certificate Issued May 1, 1984

[54] METHOD AND COMPOSITIONS FOR TREATING ALUMINUM SURFACES

[75] Inventor: David Y. Dollman, Doylestown, Pa.

[73] Assignee: Amchem Products, Inc., Ambler, Pa.

Reexamination Request:
No. 90/000,414, Jul. 1, 1983

Reexamination Certificate for:
Patent No.: 3,549,540
Issued: Dec. 22, 1970
Appl. No.: 692,725
Filed: Dec. 22, 1967

Certificate of Correction issued Apr. 27, 1971.

Certificate of Correction issued Sep. 7, 1971.

Related U.S. Application Data

[63] Continuation-in-part of Ser. No. 590,487, Oct. 31, 1966, abandoned.

[51] Int. Cl.$^3$ .................................................. C11D 7/54
[52] U.S. Cl. ...................................... 252/105; 252/79.3; 134/3; 134/41; 156/665; 156/903; 422/12
[58] Field of Search ................... 252/79.3, 105; 134/3, 134/41; 156/665, 903; 422/12

[56] References Cited
U.S. PATENT DOCUMENTS

| | | | |
|---|---|---|---|
| 2,796,370 | 6/1957 | Ostrander et al. | 148/6.2 |
| 2,796,371 | 6/1957 | Ostrander et al. | 148/6.2 |
| 2,867,514 | 1/1959 | Newhard et al. | 41/42 |
| 2,988,465 | 6/1961 | Newhard et al. | 148/62 |
| 3,458,354 | 7/1969 | Reich | 134/3 |

OTHER PUBLICATIONS

Thorne and Roberts (Ephraim), *Inorganic Chemistry,* Interscience, New York, 1947.

*Primary Examiner*—Robert A. Wax

[57] ABSTRACT

This invention relates to improvements in treating solutions for aluminum surfaces designed to remove the naturally occurring oxide film on such surfaces. Such solutions are commonly termed deoxidizing solutions.

The invention, in both its method and composition aspects, involves the addition of ferricyanides, ferrocyanides and/or nitroprussides to aluminum deoxidizing solutions to prevent the formation of copper smut on aluminum surfaces treated therein. The copper, which tends to form surface smut if the invention is not utilized, derives from the copper which is an important alloying constituent in many widely used aluminum alloys. The ferricyanides, ferrocyanides and nitroprussides of the invention are effective in a wide variety of deoxidizing solutions to prevent this copper deposition. Concentrates for addition to the deoxidizing solutions to replenish the ingredients which are consumed during the use of the solution can also be prepared in accordance with this invention. Such concentrates can contain the ferricyanides, ferrocyanides and/or nitroprussides of this invention, along with deoxidizing ingredients utilized in the solution.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–21 is confirmed.

* * * * *